United States Patent [19]

Uchman

[11] Patent Number: 5,052,082
[45] Date of Patent: Oct. 1, 1991

[54] CLAMPING SYSTEM

[75] Inventor: Frederick J. Uchman, Clarkston, Mich.

[73] Assignee: GKN Automotive Inc., Auburn Hills, Mich.

[21] Appl. No.: 491,594

[22] Filed: Mar. 12, 1990

[51] Int. Cl.⁵ .............................................. B65D 63/02
[52] U.S. Cl. ................................ 24/20 CW; 403/373; 285/252
[58] Field of Search ....... 403/373; 24/20 EE, 20 CW, 24/20 R, 20 LS, 20 W; 285/252, 253

[56] References Cited

U.S. PATENT DOCUMENTS

| 3,321,811 | 5/1967 | Thomas | 24/20 CW |
|---|---|---|---|
| 4,299,012 | 11/1981 | Oetiker | 24/19 |
| 4,305,179 | 12/1981 | Sakurada | 24/20 R |
| 4,315,348 | 2/1982 | Oetiker | 24/20 W X |
| 4,492,044 | 1/1985 | Oetiker | 24/20 R |
| 4,711,001 | 12/1987 | Oetiker | 24/20 EE X |
| 4,712,278 | 12/1987 | Oetiker | 24/20 W X |
| 4,724,583 | 2/1988 | Ojima | 24/20 R |

Primary Examiner—Andrew V. Kundrat
Attorney, Agent, or Firm—Michael J. Schmidt

[57] ABSTRACT

A clamping system for clamping a member onto a cylindrically-shaped surface. The member to be clamped has a first annular groove provided in the region which is to be clamped and a second annular groove provided in the bottom of the first annular groove. A clamping band has a body portion received in the first annular groove, a tongue received in the second annular groove, hooks for connecting the opposite ends of the body portion to each other to lock the clamping band in the first and second annular grooves, and a plastically deformable ear to tighten the clamping band about the member. In a preferred embodiment, the tongue is offset from the body portion of the clamping band.

30 Claims, 3 Drawing Sheets

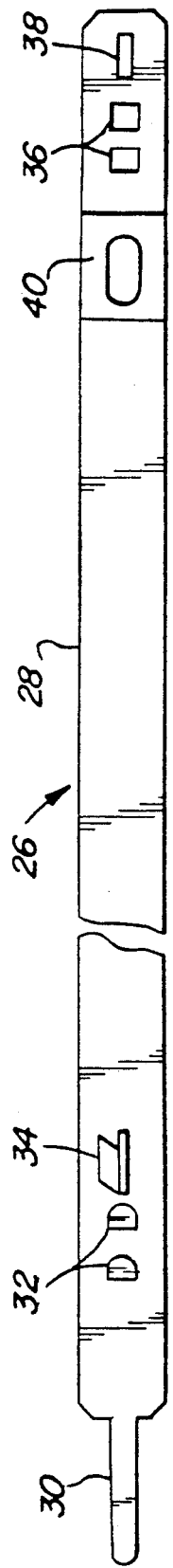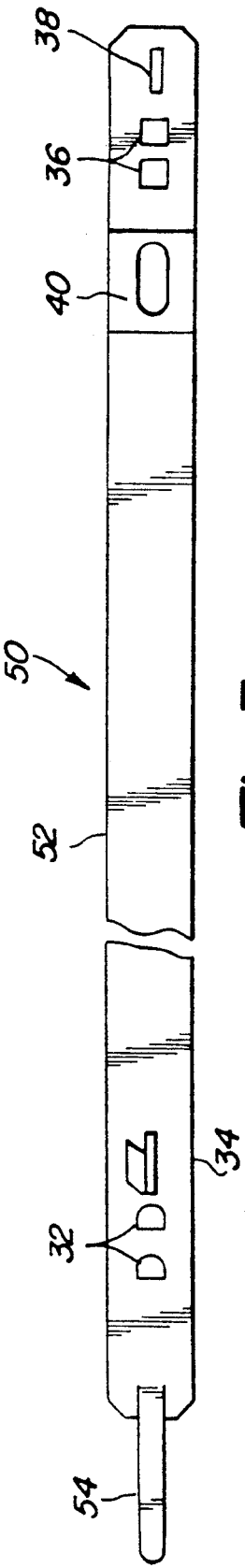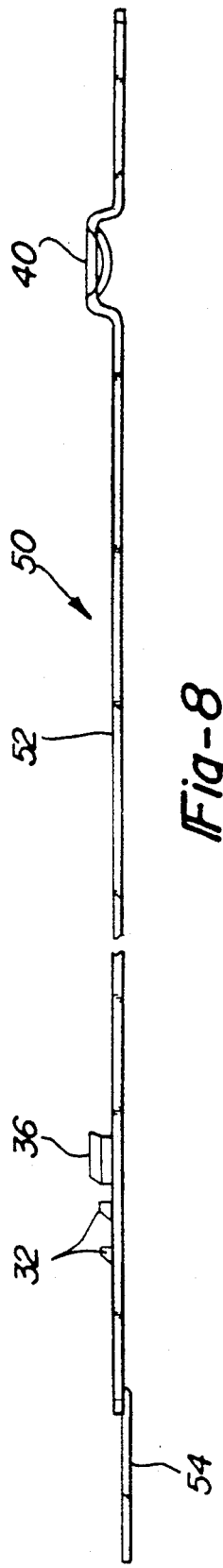

1

CLAMPING SYSTEM

BACKGROUND OF THE INVENTION

1. Field of the Invention

The invention is related to clamping systems for clamping resilient components on a tubular or cylindrically-shaped member and in particular for clamping a sealing boot over a continuously variable joint.

2. Description of the Prior Art

Currently there are two types of clamps for clamping boots or hoses on cylindrically-shaped members. The first type of clamp consist primarily of a circular band 10 having one or more hooks 12 and a collapsible ear 14 as shown in FIG. 1. The circular band 10 may be received in an annular groove 16 formed adjacent to one end of a member 18 to be clamped to a shaft as shown in FIG. 2. When the circular band 10 is wrapped around the member 18 to secure it to a shaft or cylindrically-shaped member 20, the internal end portion 22 of the circular clamp 10 forms a step in the internal surface of the clamp as shown in FIG. 1. Because of this step, the force exerted by the circular band 10 in the region 24 adjacent to the step formed by the overlapping of the internal end portion 22 is significantly less than the force exerted by the circular clamp on the remaining portion of the member 18. The reduced force exerted by the circular band 10 leads to a leakage problem in the area underlying the region 24 adjacent to the step.

One solution to this problem is the stepless type of clamp taught by Oetiker in U.S. Pat. Nos. 4,299,012, 4,315,348, and 4,492,004 and by Ojima in U.S. Pat. No. 4,724,583. The stepless type clamps have a recess or channel provided in the overlapped region of the circular clamp in which the underlying end of the clamp is received. The depth of these recesses or channels is equal to the thickness of the circular band so that the internal surface in the overlapped portion of the circular band is continuous with the internal surface outside the recess or channel eliminating the step shown in FIG. 1. A different solution to the elimination of the step formed at the end of the overlapped end of the circular band is taught by Sakurada in U.S. Pat. No. 4,305,179. In this hose clamp, one end of the circular band has a tongue which is received in a mating slot provided in the other end.

The invention is an alternate solution which does not require the formation of a mating slot, recess, or channel in the circular band.

SUMMARY OF THE INVENTION

The invention is a clamping system having a member which has at least one region which is to be clamped to a cylindrical surface. The member has a first annular groove provided in the region to be clamped and a concentric second annular groove provided in the bottom of the first annular groove, with the width of the second annular groove being smaller than the first annular groove. A clamping band has a body portion which is receivable in the first annular groove and a tongue extending from one end of the body portion which is receivable in the second annular groove. Means are provided for locking the opposite ends of the body portion to each other to lock the clamping band in the first annular groove with the tongue extending into the second annular groove and means are provided for tightening the clamping band to clamp the member onto the cylindrically-shaped surface.

In an alternate embodiment the tongue is offset from the body portion of the clamping band to eliminate the formation of a region adjacent to the step where the force exerted by the clamping band is significantly less than the force exerted outside that region.

The object of the invention is to provide a clamping system in which the effect of a step formed adjacent to the internal end of the clamping band is significantly reduced.

Another object of the invention is a clamping system in which the member to be clamped has a first annular groove receiving the body portion of the clamping band and a second annular groove provided in the bottom of the first annular groove receiving a tongue extending from the internal end of the clamping band.

Still another object of the invention is a clamping system in which a tongue is provided on the end of the clamping band which is offset into an annular groove provided in the member to be clamped to a cylindrically-shaped surface.

These and other objects of the invention will become apparent from a reading of the specification in conjunction with the drawings.

BRIEF DESCRIPTION OF THE DRAWINGS

FIG. 3 is a plan view of a clamping band in accordance with the invention;

FIG. 7 is a plan view of an alternate embodiment of the clamping band;

FIG. 8 is a side view of the clamping band shown in FIG. 7;

DETAILED DESCRIPTION OF THE PREFERRED EMBODIMENT

Figure 1:
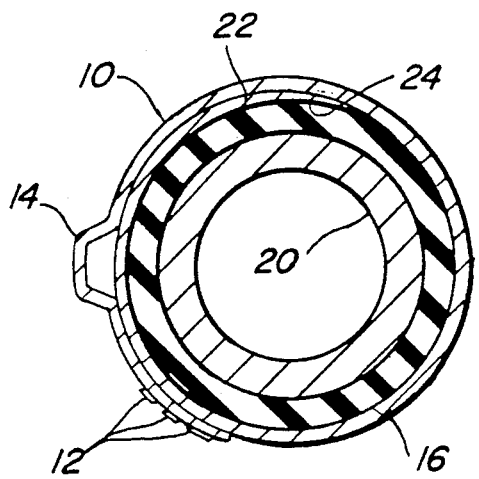
FIG. 1 is a cross-sectional view of a prior art circular clamp.
Figure 2:
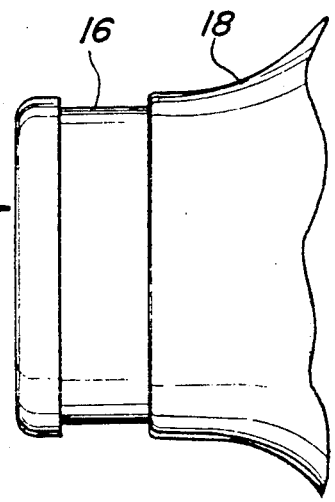
FIG. 2 is a view of a segment of a member in the region to which a prior art circular clamp is to be attached.

The details of the clamping system will be discussed relative to FIGS. 3 through 6. FIG. 3 shows the details of the clamping band 26 prior to bending it into a circular form. The clamping band 26 has a body portion 28 and a tongue 30 extending from one end thereof. The body portion 28 has a pair of support hooks 32 and a guide hook 34 which are received through rectangular apertures 36 and a slot aperture 38, respectively, when the clamping band 26 is locked about a member which is to be clamped. The support hooks 32 and the guide hook 34 are of a conventional form and their shape and function is well known in the art. The clamping band 26 also has a deformable ear 40 such as that taught by Oetiker in U.S. Pat. Nos. 4,299,012 and 4,315,348.

Figure 4:
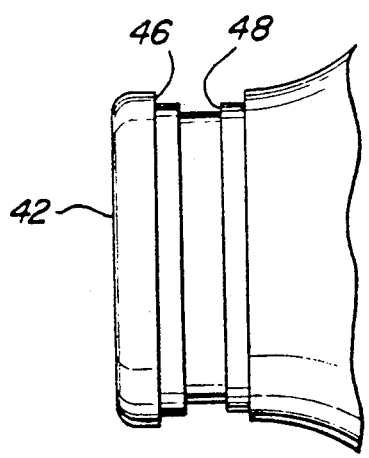
FIG. 4 is a view of a segment of a member showing the relationship of the first and second annular grooves.
Figure 5:
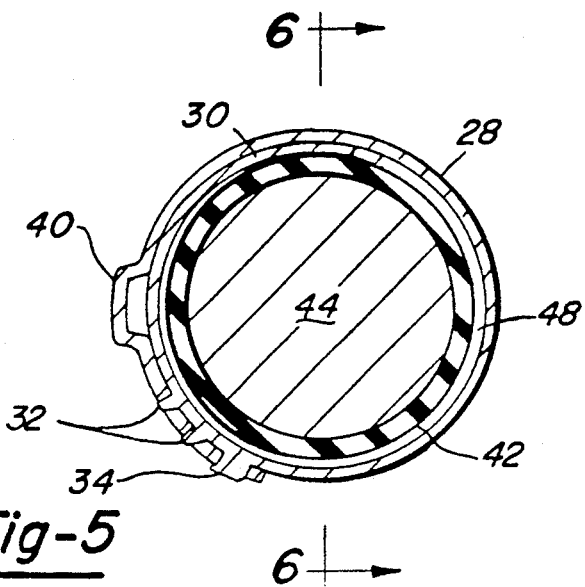
FIG. 5 is a radial cross-sectional view showing the clamping band clamping the member to a shaft.
Figure 6:
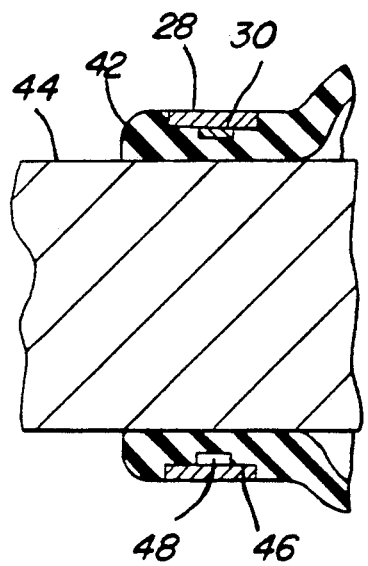
FIG. 6 is an axial cross-sectional view showing the body portions seated in the first annular groove and the tongue disposed in the second annular groove.

As shown in FIG. 4, the end of a member 42 which is to be clamped to a shaft or cylinder, such as the cylinder 20 shown in FIG. 1 or a shaft 44 as shown in FIGS. 5 and 6, has a first annular groove 46 and a concentric second annular groove 48 axially aligned with the first annular groove 46. The width of the first annular groove 46 is slightly larger than the width of the body portion 28 of the clamping band 26 and has a depth which is at least equal to the thickness of the clamping band. The width of the second annular groove 48 is slightly larger than the width of the tongue 30 and the depth taken from the bottom of the first annular groove which also is approximately equal to the thickness of the clamping band 26.

As shown in FIGS. 5 and 6, the body portion 28 of the clamping band 26 is received in the first annular groove 46 and the tongue is depressed by the overlapping portion of the clamping band into the second annular groove 48 and engages the bottom of the second annular groove 48 to apply a clamping force on the member 42 securing it to the shaft 44. The depression of the tongue 30 into the second annular groove 48 provides a gradual transition between the internal end of the body portion 28 and the point at which the body portion 28 of the clamping band reengages the bottom of the first annular groove 46. The tongue 30 shortens the area corresponding to the step region 24 shown in FIG. 1 and has been found to significantly reduce the leakage failure rate of the clamped assembly.

Figure 9:
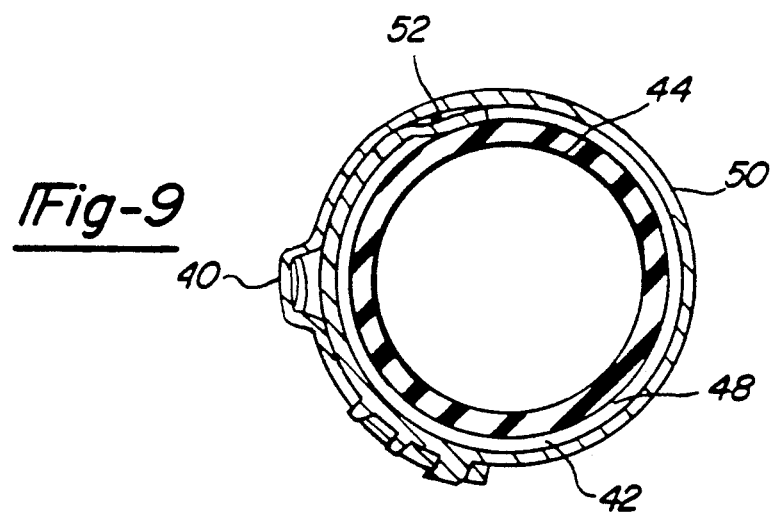
FIG. 9 is a cross-sectional view showing the clamping band of FIGS. 7 and 8 clamping a member to a shaft.

In an alternate embodiment of the clamping system, a tongue 54 of a clamping band 50 is offset as shown in FIGS. 7 and 8. The depth that the tongue 54 is offset is approximately equal to the thickness of a body portion 52 of the clamping band 50. The offset may be made at the end of the body portion 52; however, it is preferred that the tongue 54 extend inward from the end of the body portion 52 and the offset be made at the end of the tongue 54 which is recessed into the end of the body portion as shown in FIG. 8. Offsetting the tongue as shown in FIG. 8 eliminates the region at the end of the body portion 52 of the clamping band where little or no force is exerted by the clamping band on the surface of either the first or the second annular grooves 46 and 48, respectively, as shown in FIG. 9.

Figure 10:
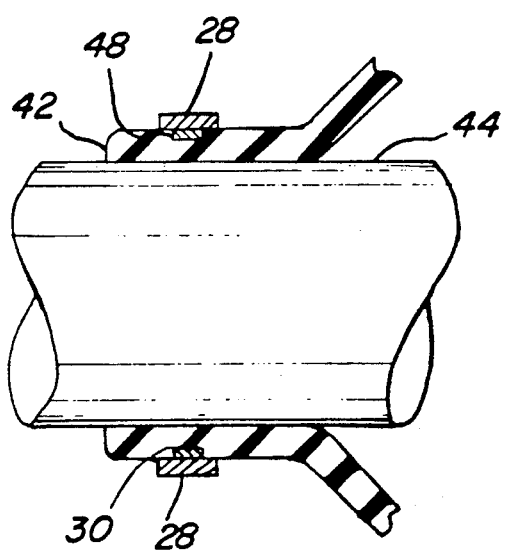
FIG. 10 shows a segmented view of the member to be clamped having only the equivalent of the second annular groove.

The first annular groove 46 provided in the member 42 to be clamped may be omitted as shown in FIG. 10, and only the second annular groove 48 is provided. In this arrangement, the body portion 28 or 52 of the clamping band engages the external surface of the member 42 and only the tongue 30 or 54 is received in the second annular groove 48 as shown. As is known in the art, a detent or second tongue receivable in the second annular groove 48 may be provided in the clamping band at a location opposite the tongue 30 or 54 to assist in locking the clamping band relative to the second annular groove and inhibit the displacement of the clamping band in an axial direction.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. A clamping system comprising:
   a member having at least one region to be clamped onto a cylindrical surface, said member having a first annular groove in said at least one region of said member and a concentric second annular groove axially aligned with said first annular groove, said second annular groove having a width smaller than the width of said first annular groove;
   a clamping band having a body portion receivable in said first annular groove, said body portion having one end and an opposite end, a tongue portion extending from said one end of said body portion receivable in said second annular groove, means for locking said one end and said opposite end of said body portion of said clamping band to each other to lock said clamping band around said member with said body portion in said first annular groove and said tongue extending into said second annular groove; and
   means for tightening said band clamp to clamp said at least one region of said member onto said cylindrical surface.

2. The clamping system of claim 1 wherein said tongue is offset from said body portion of said clamping band by a distance approximately equal to the depth of said second annular groove from the bottom of said first annular groove.

3. The clamping system of claim 2 wherein said first annular groove has a depth substantially equal to the thickness of said body portion of said clamping band and said second annular groove has a depth measured from the bottom of said first annular groove substantially equal to the thickness of said tongue.

4. The clamping system of claim 3 wherein the thickness of said body portion of said clamping band and said tongue are equal.

5. The clamping system of claim 1 wherein said means for locking comprises a plurality of hooks provided near said one end of said body portion and a plurality of apertures provided near said opposite end of said body portion, each aperture of said plurality of apertures receiving therein a respective one of said plurality of hooks, said plurality of hooks received in said plurality of apertures locking said one end and said opposite end of said body portion together to form a ring circumscribing said member in said at least one region.

6. The clamping system of claim 1 wherein said means for tightening is a plastically deformable ear.

7. The clamping system of claim 4 wherein said means for tightening is a plastically deformable ear.

8. The clamping system of claim 7 wherein said tongue is offset from said body portion of said clamping band by a distance approximately equal to the depth of said second annular groove from the bottom of said first annular groove.

9. The clamping system of claim 8 wherein said tongue extends a predetermined distance inwardly from said one end of said body portion providing an overlap between said body portion and said tongue.

10. A clamping system comprising:
    a member having at least one region to be clamped to a cylindrical surface, said member having a first annular groove provided in the external surface of said member in said at least one region and a second annular groove having a smaller width provided in the bottom of said first annular groove; and
    a clamping band circumscribing said member at said at least one region, said clamping band having a body portion receivable in said first annular groove, said body portion having one end and an opposite end, an offset tongue extending from said one end of said body portion receivable in said second annular groove and means for locking together said one end and said opposite end of said body portion to clamp said member to said cylindrical surface.

11. The clamping system of claim 10 wherein said clamping band has means for tightening said clamping band after said one end and said opposite ends of said body portion are locked together.

12. A band clamp for clamping a member into a cylindrical surface, said member having a first annular groove provided on the external surface of said member in the region it is to be clamped and a second annular groove having a smaller width provided in said member at the bottom of said first annular groove, said band clamp comprising:
   a body portion receivable in said first annular groove, said body portion having a length sufficient to circumscribe said member in said region that is to be clamped, said body portion having one end and an opposite end;
   a tongue extending from said one end of said body portion, offset from said body portion towards said second annular groove, receivable in said second annular groove; and
   means for locking provided near said one end and said opposite end of said body portion to lock said body portion in said first annular groove with said tongue extending into said second annular groove.

13. The band clamp of claim 12 wherein said tongue is offset a distance approximately equal to the depth of said second annular groove from the bottom of said first annular groove.

14. The band clamp of claim 12 wherein said tongue extends a predetermined distance inwardly from said one end of said body portion providing a region in said clamping band where said tongue and said body portion overlap each other.

15. The band clamp of claim 12 further having means for tightening said body portion of said clamping band in said first annular groove.

16. The band clamp of claim 12 further having means for tightening said body portion of said clamping band in said first annular groove.

17. The band clamp of claim 16 wherein said means for tightening is a plastically deformable ear formed in said body portion.

18. The band clamp of claim 12 wherein said means for locking comprises a plurality of hooks provided near said one end of said body portion and a plurality of apertures provided near said opposite end of said body portion, each hook of said plurality of hooks receivable in a respective one of said plurality of apertures to lock said clamping band in said first annular groove.

19. A clamping band for clamping a member onto a cylindricallyshaped surface, said member having a first annular groove provided in the external surface of said member in a region which is to be clamped and a narrower annular groove provided in the bottom of said first annular groove, said clamping band comprising:
   a body portion receivable in said first annular groove, said body portion having a length greater than a length sufficient to circumscribe said member at said region, said body portion having one end and an opposite end;
   a tongue extending from said one end of said body portion, said tongue offset from said body portion towards said narrower annular groove; and
   means provided near said one end and said opposite end of Said body portion for locking said clamping band in said first annular groove.

20. The clamping band of claim 19 further comprising means for tightening said clamping band about said member.

21. A clamping system comprising: a member to be clamped to a cylindrically-shaped surface having at least one annular groove in the region of said member which is to be clamped; and
   a clamping band having a body portion adapted to circumscribe said member in said region to be clamped, said body portion having a width greater than the width of said at least one annular groove, said body portion having one end and an opposite end, a tongue having a width approximately equal to the width of said at least one annular groove extending from said one end of said body portion, said tongue receivable in said at least one annular groove, means for connecting said one end and said opposite end of said body portion to each other with said tongue received in said at least one annular groove, and means for tightening said clamping band to clamp said member onto said cylindrically-shaped surface.

22. The clamping system of claim 21 wherein said at least one annular groove comprises a first annular groove receiving said body portion of said clamping band and a second annular groove formed in the bottom of said first annular groove in which said tongue is receivable when said clamping band is locked around said member.

23. The clamping system of claim 21 wherein said tongue is offset from said body portion.

24. The clamping system of claim 23 wherein said tongue extends a predetermined distance inwardly from said one end of said body portion, 25. A clamping band for clamping a member to a cylindrically-shaped surface wherein said member has at least one annular groove provided in the region which is to be clamped, said clamping band comprising:
   a body portion having a width greater than said at least one annular groove, said body portion having a length greater than the circumference of said member in said region, said body portion having one end and an opposite end;
   a tongue having a width approximately equal to the width of said at least one annular groove extending from said one end of said body portion; and
   means provided near said one end and said opposite end of said body portion for locking said clamping band about said member with said tongue extending into said at least one annular groove.

26. The clamping band of claim 25 further comprising means for tightening said clamping band about said member.

27. The clamping band of claim 25 wherein said tongue is offset from said body portion towards said at least one annular groove.

28. The clamping band of claim 27 wherein said tongue extends inwardly a predetermined distance from said one end of said body portion.

29. The clamping band of claim 28 wherein said at least one annular groove comprises a first annular groove in which said body portion of said clamping band is received and a concentric second annular groove provided in the bottom of said first annular groove in which said tongue is received when said clamping band is locked about said member.

30. The clamping band of claim 29 further comprising means for tightening said clamping band about said member.

* * * * *